(12) United States Patent
Nakahama et al.

(10) Patent No.: US 7,746,270 B2
(45) Date of Patent: Jun. 29, 2010

(54) RADAR APPARATUS AND RADAR TUNING METHOD

(75) Inventors: Masahiro Nakahama, Nishinomiya (JP); Sae Takemoto, Nishinomiya (JP); Koji Dai, Nishinomiya (JP)

(73) Assignee: Furuno Electric Company Limited, Nishinomiya-shi (JP)

( * ) Notice: Subject to any disclaimer, the term of this patent is extended or adjusted under 35 U.S.C. 154(b) by 59 days.

(21) Appl. No.: 11/789,778

(22) Filed: Apr. 25, 2007

(65) Prior Publication Data

US 2007/0252751 A1 Nov. 1, 2007

(30) Foreign Application Priority Data

Apr. 28, 2006 (JP) ............................. 2006-127004

(51) Int. Cl.
*G01S 13/10* (2006.01)
*G01S 7/28* (2006.01)
*G01S 7/04* (2006.01)
*G01S 13/72* (2006.01)

(52) U.S. Cl. .................. 342/137; 342/100; 342/134; 342/139; 342/175; 342/179

(58) Field of Classification Search ............. 342/100, 342/134, 137, 139, 175, 179
See application file for complete search history.

(56) References Cited

U.S. PATENT DOCUMENTS

| | | | | |
|---|---|---|---|---|
| 2,987,720 A | * | 6/1961 | Katzin ......................... 342/159 |
| 3,339,197 A | * | 8/1967 | Tate ............................ 342/202 |
| 3,603,991 A | * | 9/1971 | Bernstein et al. ............ 342/204 |
| 4,068,235 A | * | 1/1978 | Peters et al. ................. 342/201 |
| 4,412,219 A | * | 10/1983 | Briggs .......................... 342/51 |
| 5,057,845 A | * | 10/1991 | Gellekink .................... 342/137 |
| 5,347,283 A | * | 9/1994 | Krizek et al. ................ 342/201 |
| 6,781,470 B2 | * | 8/2004 | Rogerson ...................... 331/57 |
| 2008/0122684 A1 | * | 5/2008 | Nakahama et al. .......... 342/179 |
| 2008/0136704 A1 | * | 6/2008 | Chan et al. ................... 342/201 |

FOREIGN PATENT DOCUMENTS

| | | |
|---|---|---|
| JP | 04-098179 | 3/1992 |
| JP | 2000-206225 | 7/2000 |
| JP | 3507717 | 12/2003 |

* cited by examiner

*Primary Examiner*—Thomas H Tarcza
*Assistant Examiner*—Cassi Galt
(74) *Attorney, Agent, or Firm*—Nutter McClennen & Fish LLP; John J. Penny, Jr.

(57) ABSTRACT

A radar apparatus transmits a pulse signal including pulses having at least two different pulselengths in a specific transmit pulse pattern and receives a returning echo signal through a single antenna. A tuning voltage setting timing generator generates a timing of setting a tuning voltage according to a combination of transmission pulselengths and a tuning processor performs tuning operation in a manner suited to a current transmission pulselength based on the tuning voltage setting timing. The radar apparatus may include a tuning voltage alteration decider for deciding whether or not to alter the tuning voltage based on a combination of alternate pulselengths before altering the pulselength of the pulse signal generated by a transmitter and the tuning processor alters the tuning voltage based on the result of decision made by the tuning voltage alteration decider.

7 Claims, 4 Drawing Sheets

RADAR APPARATUS AND RADAR TUNING METHOD

BACKGROUND OF THE INVENTION

1. Field of the Invention

The present invention relates generally to a radar apparatus and, more particularly, to a tuning method used in a radar apparatus which transmits and receives signals having multiple pulselengths assigned individually to selected range scales through a single antenna.

2. Description of the Related Art

A radar apparatus conventionally used on a ship, for instance, transmits a specific pulse signal and receives an echo signal reflected by surrounding targets through an antenna. The radar apparatus determines angular direction, or bearing (.theta.), of a particular target from the direction of the antenna as well as a range (r) to the target based on the time elapsed from transmission of the pulse signal to reception of the echo signal.

The pulse signal transmitted from the antenna has a pulselength which is determined in accordance with a detection range and range discrimination that are required. Typically, the pulselength is determined for each range scale selected for on-screen presentation. For example, a short pulselength is selected to achieve higher range discrimination on a short range scale as echoes received from nearby targets are generally strong, whereas a long pulselength is selected to receive a larger amount of information and thereby achieve improved target detectability on a long range scale as echoes from far targets are weakened.

If the transmission pulselength is lengthened to improve long-range target detectability, however, the range discrimination deteriorates. Thus, there arises a drawback that nearby targets can not be discriminated from one another when these targets are observed on a long range scale. The conventional radar apparatus exhibits this drawback most conspicuously particularly when viewing nearby targets on a long range scale. For this reason, it has been necessary for a radar observer to switch the radar apparatus to an optimum range scale depending on the distance between own ship and targets of interest.

Although some radar apparatuses offer a "zoom" function which is conventional, the zoom function simply displays an enlarged picture obtained by "zooming in" part of the echo signal received on the range scale in use and, thus, the enlarged part of the echo signal is not displayed with increased range discrimination. Therefore, the zoom function does not provide any solution to the aforementioned drawback of the conventional radar apparatus.

Japanese Patent Application Publication No. 1992-98179 and Japanese Patent No. 3507717 each disclose a technique which enables a radar apparatus to transmit signals having different pulselengths assigned individually to two or more range scales according to a selected transmit pulse sequence and simultaneously display radar pictures on two or more range scales. This technique, if implemented in a radar apparatus, makes it possible to simultaneously present echo signals obtained with multiple pulselengths on different range scales with high target detectability.

The aforementioned technique of Japanese Patent Application Publication No. 1992-98179 and Japanese Patent No. 3507717 however has a problem that a receiving circuit employing a conventional tuning method can not perform filtering operation at a sufficiently high signal-to-noise ratio (SNR). This is because the radar apparatus employing the technique successively switches the pulselength at high speed according to the transmit pulse sequence.

This problem of the aforementioned multiple pulselength technique is now examined in detail.

A commonly known conventional radar apparatus successively transmits pulses having a single pulselength which is determined in accordance with a detection range and range discrimination that are required. Thus, the pulselength of a pulse signal to which a receiving circuit of the radar apparatus should be tuned remains constant over time, so that the receiving circuit can normally execute tuning operation at a desired timing without the need to verify the pulselength of the signal. In performing the tuning operation, the receiving circuit sets a tuning voltage at the earliest timing according to task priority in order that a tuning voltage value given by a signal processor will be achieved as soon as possible.

Since the receiving circuit once tuned does not become greatly mistuned in actuality, the receiving circuit does not perform the tuning operation at every transmit pulse to alleviate work load of a mathematical processor of the radar apparatus. Rather, the receiving circuit performs the tuning operation at specified time intervals regardless of transmit signal output timing.

If the tuning operation of this kind performed in the conventional radar apparatus is used in combination with the aforementioned technique of Japanese Patent Application Publication No. 1992-98179 and Japanese Patent No. 3507717, it would be impossible to control the tuning voltage in such a way that the tuning voltage varies in accordance with the frequently switched pulselength of the transmit signal, and this would result in the aforementioned problem that an echo signal having a sufficient SNR is not obtainable.

It is to be pointed out that even the conventional radar apparatus switches the receiving circuit from one transmit signal pulselength to another when the range scale is altered. Operation carried out by the conventional radar apparatus when the pulselength is changed is as follows. First, the radar apparatus gives operational parameters corresponding to the newly selected transmit signal pulselength to individual processors and the individual processors perform signal processing suitable for the new pulselength according to the given operational parameters.

Then, a tuning processor generates a tuning voltage value corresponding to the newly selected transmit signal pulselength using a main bang signal obtained by transmission and reception of the pulse signal having the new pulselength and performs operation for setting and generating a new tuning voltage.

The aforementioned tuning operation however requires an extremely long period of time compared to a transmission interval of the pulse signal. Thus, if the above-described conventional tuning operation is used in combination with the technique of Japanese Patent Application Publication No. 1992-98179 and Japanese Patent No. 3507717, the aforementioned problem that an echo signal having a sufficient SNR is not obtainable would result.

SUMMARY OF THE INVENTION

In light of the aforementioned problems of the prior art, it is an object of the invention to provide a radar apparatus which can perform tuning operation in a manner suited to a selected transmit signal pulselength even if the radar apparatus is switched from one transmit signal pulselength to another at high speed.

To provide a solution to the aforementioned problems of the prior art, a radar apparatus capable of transmitting a pulse signal including pulses having at least two pulselengths and receiving a returning echo signal through a single antenna includes a transmitter for generating the pulse signal having the at least two pulselengths according to a specific transmit pulse pattern, a receiver for down-converting the received echo signal using a local oscillation frequency, a tuning voltage setting timing generator for generating a tuning voltage setting timing according to the aforementioned transmit pulse pattern, and a tuning processor for controlling the local oscillation frequency by altering a tuning voltage according to the aforementioned tuning voltage setting timing. Even when the radar apparatus is set to alternately transmit microwave pulses having two different pulselengths, the radar apparatus thus configured can control a local oscillator such that the oscillating frequency thereof would follow changes in transmitting frequency of the transmitter and thereby obtain an echo signal having a high SNR.

For efficient transmission and reception of the pulse signal, it is desirable for the radar apparatus thus configured to take into consideration the transmission pulselengths, an echo signal sampling period and a time lag from the beginning of tuning voltage setting to a point in time when a desired local oscillation frequency is reached in determining the aforementioned transmit pulse pattern of the transmitted pulse signal. In a case where a magnetron is used as an oscillating device of the transmitter, it is desirable to take also into consideration an idle time of the magnetron that occurs between one transmit and the next.

In one feature of the invention, the radar apparatus further includes a tuning voltage alteration decider for deciding whether or not to alter the tuning voltage based on a combination of alternate pulselengths before and after altering the pulselength of the transmitted pulse signal, and the tuning processor performs operation for altering the tuning voltage based on the result of decision made by the tuning voltage alteration decider. This approach makes it possible to alleviate work load imposed on such signal processors as the tuning processor and decrease the number of factors which may cause tuning instability.

In another feature of the invention, the tuning voltage alteration decider decides whether or not to alter the tuning voltage based on required tuning ranges before and after pulselength alteration that are determined by bandwidths of a receiving filter having bandwidths suited to the transmission pulselengths and on transmitting frequency deviation that occurs as a result of pulselength alteration.

In still another feature of the invention, the radar apparatus alternately transmitting microwave pulses having two different pulselengths at regular intervals is configured such that the tuning voltage alteration decider examines whether two values, obtained by adding the transmitting frequency deviation that occurs as a result of pulselength alteration to a minimum and a maximum permissible frequency of the narrower required tuning range between which are obtained before and after pulselength alteration, fall within a permissible frequency range of the wider required tuning range, and causes said tuning processor to perform tuning operation without altering the tuning voltage if both of said two values fall within the permissible frequency range of the wider required tuning range and to perform the tuning operation upon altering the tuning voltage if any of said two values do not fall within the permissible frequency range of the wider required tuning range.

According to the present invention, the tuning voltage setting timing generator generates the tuning voltage setting timing according to the transmit pulse pattern defining the order of transmission of pulses having different pulselengths and performs the tuning operation based on the tuning voltage setting timing generated by the tuning voltage setting timing generator. Consequently, the radar apparatus of the invention can alter the tuning voltage in an optimum fashion and perform the tuning operation in a manner suited to each pulselength, making it possible to obtain radar pictures of high quality even when the radar apparatus is frequently switched between the two different pulselengths.

Also, as the transmit pulse pattern of the pulse signal is determined according to the transmission pulselengths, the echo signal sampling period and the time lag from the beginning of tuning voltage setting to the point in time when the desired local oscillation frequency is reached, it is possible to properly control transmission of pulses having different pulselengths as well as tuning voltage setting timing and thereby transmit and receive the pulse signal in an efficient manner according to a combination of alternate pulselengths.

In a case where a magnetron is used as the oscillating device of the transmitter, the transmit pulse pattern of the pulse signal is determined based on the echo signal sampling period and the time lag from the beginning of tuning voltage setting to the point in time when the desired local oscillation frequency is reached as well as the idle time of the magnetron between one transmit and the next that is determined by the transmitter. This also makes it possible to properly control transmission of pulses having different pulselengths as well as tuning voltage setting timing and thereby transmit and receive the pulse signal in an efficient manner according to a combination of alternate pulselengths.

Furthermore, the radar apparatus of the invention is provided with the tuning voltage alteration decider which decides whether or not to alter the tuning voltage based on a combination of alternate pulselengths before the pulselength of the transmit signal is altered, and the tuning processor determines whether or not to alter the tuning voltage based on the result of the decision made by the tuning voltage alteration decider. The radar apparatus thus configured can alleviate work load imposed on such signal processors as the tuning processor and decrease the number of factors which may cause tuning instability.

These and other objects, features and advantages of the invention will become more apparent upon a reading of the following detailed description in conjunction with the accompanying drawings.

DETAILED DESCRIPTION OF THE PREFERRED EMBODIMENTS OF THE INVENTION

The invention is now described in detail with reference to the appended drawings.

First Embodiment

Figure 1:
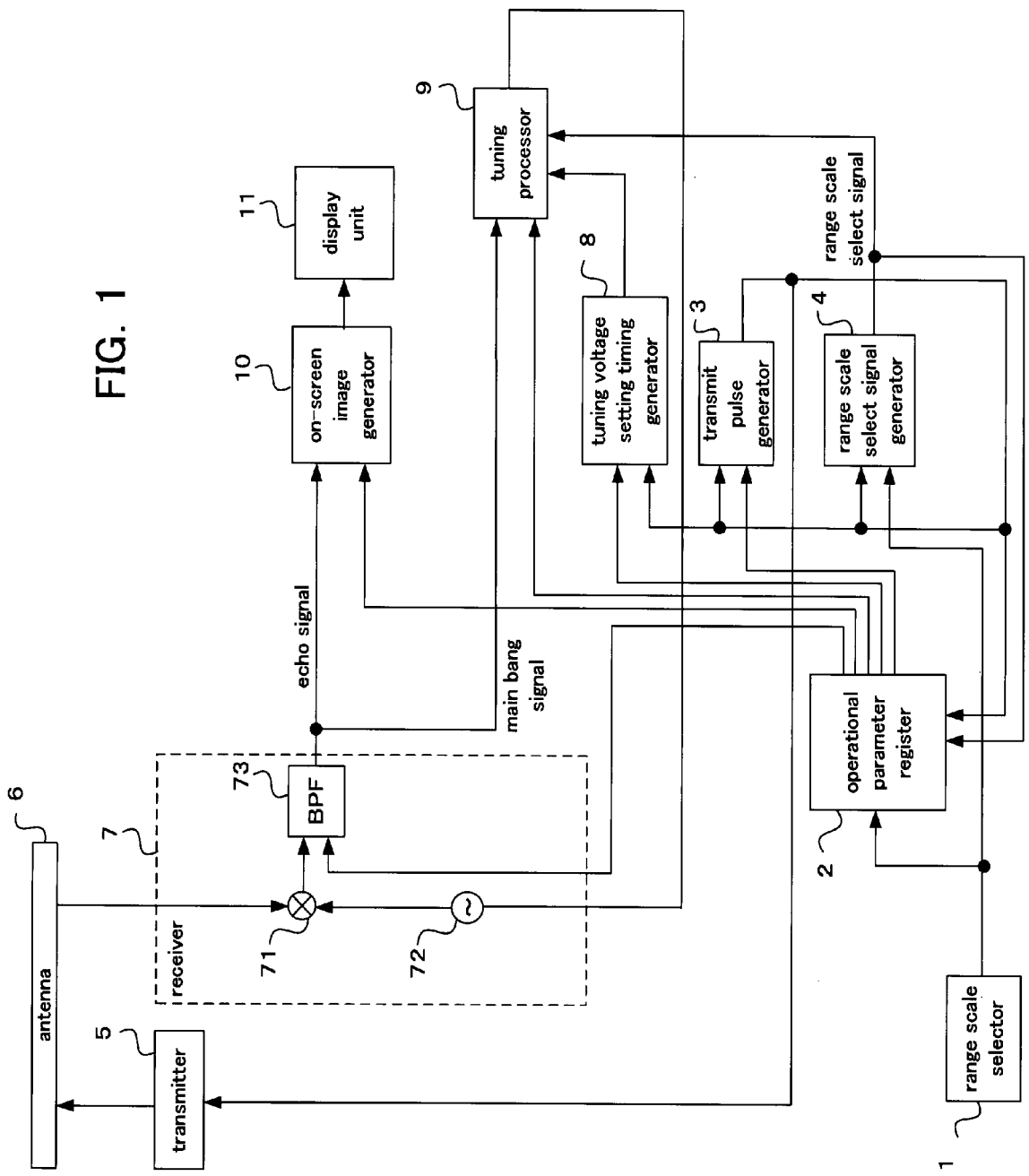
FIG. 1 is a block diagram showing the configuration of a radar apparatus according to a first embodiment of the invention.

FIG. 1 is a block diagram showing the configuration of a radar apparatus according to a first embodiment of the invention. As shown in FIG. 1, the radar apparatus of the first embodiment includes a range scale selector 1, an operational parameter register 2, a transmit pulse generator 3, a range scale select signal generator 4, a transmitter 5, an antenna 6, a receiver 7, a tuning voltage setting timing generator 8, a tuning processor 9, an on-screen image generator 10 and a display unit 11.

The range scale selector 1 determines a range scale for on-screen presentation in accordance with an operator input. If the operator intends to simultaneously present a pair of radar pictures on two different range scales, the operator selects a dual-picture display mode and the two range scales for on-screen presentation by manipulating appropriate operating controls, such as keys and knobs. The range scale selector 1 determines a combination of two range scales for on-screen presentation as selected by the operator and outputs this combination of two range scales to the operational parameter register 2. Then, the operational parameter register 2 determines transmission pulselengths preset for the two range scales selected. On the other hand, the range scale select signal generator 4 determines a pulse signal transmission sequence in accordance with the specified combination of range scales.

The operational parameter register 2 is a register which holds specific operational parameters for individual circuits according to the pulselengths of a pulsed transmit signal and supplies the operational parameters to pertinent constituent elements of the radar apparatus according to the transmission pulselengths preset for the selected range scales, a pulse signal output from the transmit pulse generator 3 and a range scale select signal output from the range scale select signal generator 4.

The transmit pulse generator 3 determines transmission intervals of successive pulses of the transmit signal for the selected range scales and generates waveforms of the pulses to be transmitted at the specified pulselengths based on information given by the operational parameter register 2. The operational parameter register 2 gives the pulselength of a pulse to be transmitted next and information on pulse amplitude as well as a next signal transmission timing to the transmit pulse generator 3 based on the range scale select signal fed from the range scale select signal generator 4. The transmit pulse generator 3 counts time up to the next signal transmission timing given by the operational parameter register 2. When the signal transmission timing is reached, the transmit pulse generator 3 generates a pulse signal having the specified pulselength and amplitude.

The range scale select signal generator 4 stores a predefined transmission sequence suited to the combination of range scales determined by the range scale selector 1. The range scale select signal generator 4 outputs the range scale select signal which notifies the individual constituent elements of the radar apparatus of the pulselength of a next pulse to be transmitted according to the transmission sequence for the selected combination of range scales. The expression "transmission sequence" as used in this Specification refers to information which determines an order of transmission of pulses for the individual range scales. Provided that the operator selects the dual-picture display mode to simultaneously present two radar pictures on range 0 and range 1, for example, the transmission sequence defines in what order the radar apparatus should transmit pulses on range 0 and range 1 at pulselengths suited to the respective range scales. The information provided by the transmission sequence may be such that the radar apparatus should alternately transmit pulses on range 0 and range 1, or two successive pulses on range 0 and then one pulse on range 1 in repetitive cycles, for instance.

In the radar apparatus of the first embodiment structured as illustrated in FIG. 1, the transmission sequence determines a transmit pulse pattern which defines the order of transmission of pulses having different pulselengths and pulse repetition intervals according to the combination of range scales specified by operator through the range scale selector 1. To be more specific, the range scale select signal generator 4 determines the order of transmission of pulses upon receiving information on the combination of range scales output from the range scale selector 1, and the transmit pulse generator 3 determines the pulse repetition intervals suited to the respective range scales according to the information on the combination of range scales based on the operational parameters fed from the operational parameter register 2.

The transmitter 5 generates a radio signal with the same pulselengths and timing as specified by the pulse signal output from the transmit pulse generator 3 and delivers the radio signal to the antenna 6 for transmission. An oscillating device commonly used for generating radio waves in the transmitter 5 is a magnetron or a semiconductor device, for example.

The antenna 6 transmits the radio signal generated by the transmitter 5 and receives an echo signal reflected by targets while rotating at a specified speed.

The receiver 7 receives the echo signal fed from the antenna 6 in successive transmit cycles through a filtering circuit having a bandwidth suited to the pulselengths of the transmit signal. To achieve this, the receiver 7 includes a mixer 71, a local oscillator 72 and a bandpass filter (BPF) 73. Operation performed by the mixer 71 and the local oscillator 72 is to down-convert the echo signal received by the antenna 6 by using a locally generated frequency output from the local oscillator 72. The BPF 73 removes noise from a signal output from mixer 71 by use of the filtering circuit having the bandwidth suited to the pulselengths based on pulselength information fed from the operational parameter register 2. The echo signal contained in an output of the BPF 73 is delivered to the on-screen image generator 10 whereas a main bang signal also contained in the output of the BPF 73 is delivered to the tuning processor 9 for use in tuning operation. It is possible to separate the echo signal and the main bang signal from each other by properly switching a selector according to time elapsed after each transmission of the pulse signal, for instance.

To constantly obtain a radar picture with high sensitivity, it is necessary to properly adjust the oscillating frequency of the local oscillator 72 of the receiver 7 to make up for variations in frequency of the transmit signal generated by the transmitter 5.

Generally, when the radar apparatus is switched from one transmit signal pulselength to another, the frequency of the transmit signal should ideally remain unchanged and only the pulselength should change. In actuality, however, the transmitting frequency slightly deviates as a result of changes in transmission pulselength and amplitude.

Discussed below with reference to Tables 1 and 2 is how the oscillating frequency of the oscillating device (e.g., magnetron) of the transmitter 5 deviates when the radar apparatus is switched from one transmit signal pulselength to another.

Table 1 shows a relationship between pulse types S1, M1, M2, L and corresponding pulselengths of the transmit signal in nanoseconds, and Table 2 shows results of measurements of the amounts of transmitting frequency deviation that occurs when the pulselength is switched between S1 and L, between M1 and L, and between M2 and L.

TABLE 1

| Pulse type | Pulselength |
|---|---|
| S1 | 80 ns |
| M1 | 300 ns |
| M2 | 500 ns |
| L | 1200 ns |

TABLE 2

| | Combination of pulselengths | | |
|---|---|---|---|
| | S1-L | M1-L | M2-L |
| Transmitting frequency deviation (MHz) | 3.1 | 1.2 | 0.5 |

If the transmit signal pulselength is varied, the frequency of the pulse signal emitted from the transmitter 5 varies as shown above. Thus, it is necessary to control the local oscillator 72 such that the oscillating frequency thereof would follow changes in the transmitting frequency. The oscillating frequency of the local oscillator 72 is controlled by a tuning voltage input from the tuning processor 9 into the local oscillator 72 according to a tuning voltage setting timing generated by the tuning voltage setting timing generator 8.

The tuning voltage setting timing generator 8 is means for giving a timing of altering the tuning voltage in execution of the tuning operation performed by the tuning processor 9. Specifically, the tuning voltage setting timing set in the tuning processor 9 is generated according to the transmit pulse pattern of the pulse signal emitted from the transmitter 5.

While the transmit pulse pattern of the pulse signal is determined based on the parameters stored in the operational parameter register 2 and the range scale select signal generator 4 as previously mentioned, these parameters are determined according to an echo signal sampling period and a time lag from the beginning of tuning voltage setting to a point in time when a desired local oscillation frequency is reached. In a case where a magnetron is used as the oscillating device of the transmitter 5, it is desirable to take into consideration idle time of the magnetron that occurs between one transmit and the next when determining the transmit pulse pattern.

As a result, it becomes possible to switch the tuning voltage in a manner optimally suited to the timing of altering the pulselength of the transmit signal, decrease the pulse repetition intervals, and efficiently transmit and receive the pulse signal. Generally, the aforementioned echo signal sampling period is determined depending on the range scale in use. Typically, received echo data is sampled for a duration of time corresponding approximately to 1.5 times the selected range scale.

The tuning processor 9 is provided with storage means, such as a register, for storing predefined tuning voltages. The tuning processor 9 sets a tuning voltage suited to the range scale specified by the range scale select signal based on the tuning voltage setting timing given by the tuning voltage setting timing generator 8.

Operation performed by the tuning processor 9 for generating the tuning voltage is as follows. First, the tuning processor 9 receives the number of samples to be sampled corresponding to the current pulselength from the operational parameter register 2 and extracts the specified number of samples of main bangs from a received signal of the same pulselength based on the range scale select signal. Then, the tuning processor 9 obtains information on the current transmitting frequency from the specified number of samples of the main bangs that have been extracted and generates the tuning voltage corresponding to this frequency information. The tuning voltage thus generated is once stored in the storage means of the tuning processor 9.

While the tuning voltage may be generated beforehand from the main bangs by the aforementioned method in the present embodiment, the radar apparatus may be modified such that the operational parameter register 2 stores fixed values of tuning voltages suited to plural pulselengths and the tuning processor 9 generates the tuning voltage according to a tuning voltage value supplied from the operational parameter register 2.

Subsequently, the tuning processor 9 sets the tuning voltage generated in advance at the tuning voltage setting timing relevant to the pulselength of the transmit signal. It is to be noted that when the tuning voltage is determined in advance from the main bangs, the tuning voltage that will be detected will not vary in real time but will be reflected in the transmit signal of the same pulselength emitted after the signal used for generating the tuning voltage is received.

The on-screen image generator 10 performs such operations on the echo signal fed from the receiver 7 as gain adjustment, unwanted signal rejection and resampling of the received echo data according to the selected range scale based on the operational parameters supplied from the operational parameter register 2 and generates a radar picture to be presented on the display unit 11. If the operator selects the dual-picture display mode and two different range scales, the rotating antenna 6 alternately transmits microwave pulses having two different pulselengths at a common pulse repetition rate or transmits the same at different pulse repetition rates, whereby the radar apparatus can simultaneously present a pair of full-circle radar pictures on the two different range scales.

Now, the working of the radar apparatus of the first embodiment is described with reference to an example in which the dual-picture display mode is selected to simultaneously present a pair of radar pictures on two different range scales.

When the operator selects the dual-picture display mode and specifies two range scales for on-screen presentation by manipulating the appropriate operating controls, the range scale selector 1 outputs a relevant signal to the operational parameter register 2 and the range scale select signal generator 4. Upon receiving information regarding the display mode and range scales, the operational parameter register 2 prepares appropriate operational parameters to be supplied to the relevant constituent elements of the radar apparatus and outputs information on the pulselength of a pulse to be first emitted, information on pulse amplitude and a next signal transmission timing to the transmit pulse generator 3. Also, the range scale select signal generator 4 determines a transmission sequence suited to the selected combination of two range scales.

Upon receiving the operational parameters from the operational parameter register 2, the transmit pulse generator 3 measures time up to the next signal transmission timing and generates a pulse signal having the specified pulselength and amplitude when the next signal transmission timing is reached. The transmit pulse generator 3 can easily perform this operation with the provision of time measuring means, such as a counter, which counts time elapsed from generation of the preceding pulse so that the transmit pulse generator 3 will generate another pulse at a point in time when the time measuring means reaches a specific count value given as the next signal transmission timing by the operational parameter register 2.

The pulse signal output from the transmit pulse generator 3 is supplied to the operational parameter register 2, the range scale select signal generator 4 and the tuning voltage setting timing generator 8 and fed back to the transmit pulse generator 3 as trigger information to notify these elements of the signal transmission timing. The pulse signal is supplied also to the transmitter 5 as a signal for notifying the transmitter 5 of the transmit signal pulselength and amplitude.

Using the pulse signal output from the transmit pulse generator 3 as a trigger, the range scale select signal generator 4 outputs the range scale select signal indicating the pulselength of the next pulse to be transmitted on the range scale to be processed next to the operational parameter register 2 and the tuning processor 9.

Next, the operational parameter register 2 supplies the operational parameters corresponding to the range scale specified by the range scale select signal to the relevant constituent elements of the radar apparatus at a transmit pulse output timing given by the transmit pulse generator 3.

The transmitter 5 transmits the pulse signal including pulses having the pulselength specified for each range scale through the antenna 6 according to the specified transmit pulse pattern. More specifically, the transmitter 5 generates radio waves to be emitted at the pulselength, amplitude and transmission timing output from the transmit pulse generator 3 for each range scale and performs operation for transmitting the generated radio signal through the antenna 6. As the transmitted radio signal is reflected by targets, a resultant return signal is received by the antenna 6 and delivered to the receiver 7, in which the mixer 71 down-converts the received signal into an intermediate frequency (IF) signal by using the local oscillation frequency output from the local oscillator 72. Then, the BPF 73 filters out noise contained in the IF signal. The echo signal contained in the output of the BPF 73 is delivered to the on-screen image generator 10 whereas the main bang signal also contained in the output of the BPF 73 is delivered to the tuning processor 9 as previously mentioned. The bandwidth of the filtering circuit for removing the noise is suited to the pulselength of the transmit signal. Information on the bandwidth of the filtering circuit is supplied from the operational parameter register 2 to the BPF 73.

To constantly obtain radar pictures with high sensitivity in the aforementioned operation of the receiver 7, it is necessary to properly adjust the oscillating frequency of the local oscillator 72 to make up for variations in frequency of the transmit signal generated by the transmitter 5, and it is essential to exactly convert frequencies of the received echo signal down into a passband of the filtering circuit of the BPF 73. This is achieved by below-described tuning voltage control operation performed by the tuning voltage setting timing generator 8 and the tuning processor 9.

Explained below is operation performed by the tuning voltage setting timing generator 8 for generating the tuning voltage setting timing according to the transmit pulse pattern which defines the order of transmission of pulses having different pulselengths and pulse repetition intervals. FIGS. 2A to 2E are timing charts used for explaining the tuning voltage control operation performed by the radar apparatus of the first embodiment in connection with an example of the transmit pulse pattern in which the radar apparatus alternately transmits microwave pulses having the pulselengths on two different range scales (ranges 0 and 1).

Figure 2:
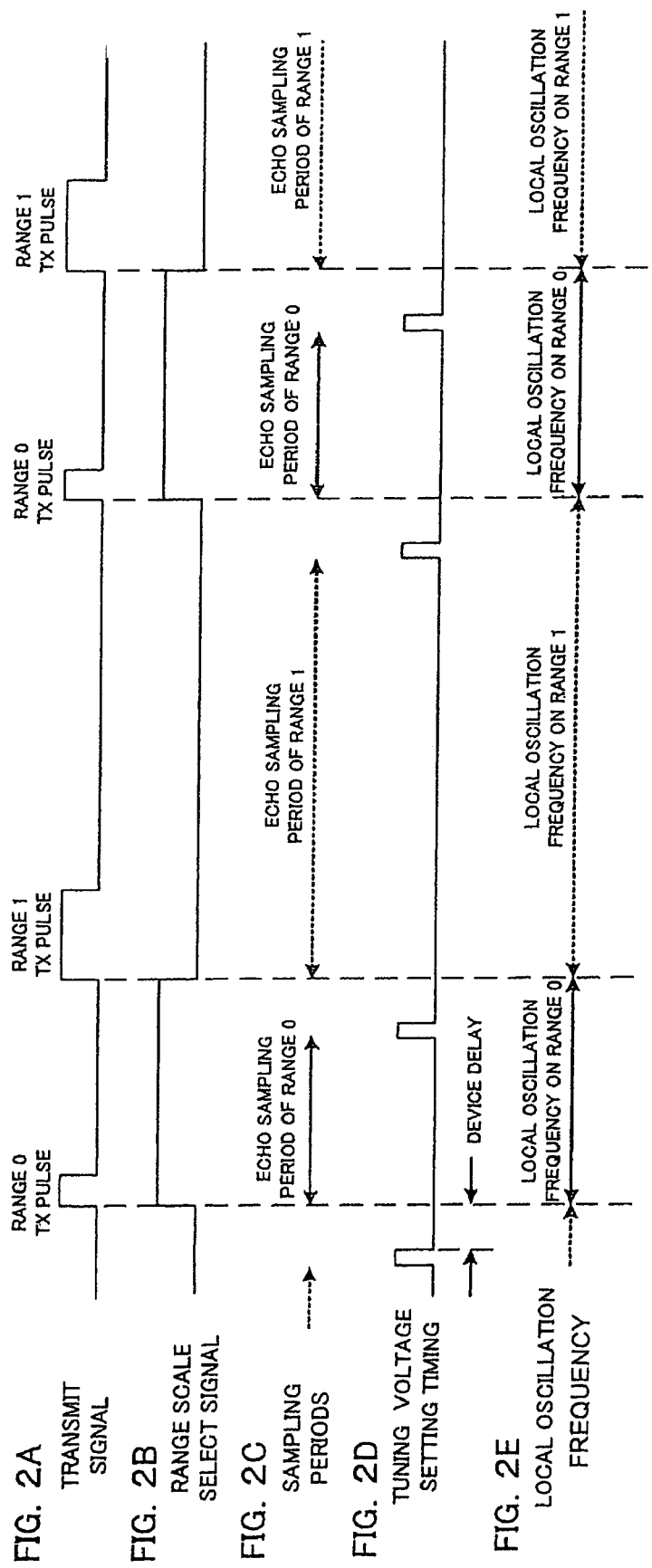
FIGS. 2A to 2E are timing charts used for explaining tuning voltage control operation performed by the radar apparatus of the first embodiment.

FIG. 2A shows the pulse signal output from the transmit pulse generator 3, and FIG. 2B shows the range scale select signal output from the range scale select signal generator 4. Since the transmission sequence is to transmit the pulses alternately on range 0 and range 1 in this example, the polarity of the range scale select signal is inverted at each successive leading edge of the transmitted pulses. FIG. 2C shows echo signal sampling periods during which echoes of the transmitted pulses are received. In the dual-picture display mode, the sampling periods suited to the respective range scales are selected. FIG. 2D shows a tuning voltage setting timing signal output from the tuning voltage setting timing generator 8, and FIG. 2E shows how the local oscillation frequency output from the local oscillator 72 varies as a result of the tuning voltage control operation performed by the tuning processor 9.

The tuning voltage setting timing generator 8 receives an operational parameter used for determining the tuning voltage setting timing for the range scale specified by the current range scale select signal at first. The operational parameter which is closely related to the transmit pulse pattern of the transmitted radio signal is output from the operational parameter register 2 at each successive leading edge of the transmitted pulses. Referring to the example shown in FIGS. 2A to 2E, this operational parameter specifies a time duration from the leading edge of each transmit pulse to the end of the sampling period. The tuning voltage setting timing generator 8 measures time elapsed up to the end of the sampling period and generates a trigger pulse which is used for setting the tuning voltage at the end of the sampling period.

The tuning voltage setting timing generator 8 can perform this operation with the provision of time measuring means, such as a counter, which counts time elapsed from the leading edge of each transmit pulse so that the tuning voltage setting timing generator 8 will generate a next trigger pulse at a point in time when the time measuring means reaches a specific count value corresponding to the time duration output from the operational parameter register 2.

The tuning voltage setting timing generated by the tuning voltage setting timing generator 8 is input into the tuning processor 9 and, then, the tuning processor 9 performs the tuning operation in a manner suited to the current range scale.

A specific delay time occurs from a point of altering the tuning voltage up to a point in time when the oscillating frequency of the local oscillator 72 varies to a desired frequency as shown in FIG. 2D due to the influence of a device delay. For this reason, it is necessary to vary the oscillating frequency of the local oscillator 72 before the beginning of a succeeding sampling period during which the receiver 7 receives the echo signal in a next receive cycle for executing the tuning voltage control operation in an optimum fashion.

It is therefore desirable to take into consideration the echo signal sampling period and the delay time from the beginning of tuning voltage setting to the point in time when the desired local oscillation frequency is reached in determining the transmit pulse pattern. This would make it possible to properly control the transmit pulse pattern of the pulse signal and the tuning voltage setting timing in a manner suited to the specified range scales and efficiently transmit and receive the pulse signal.

In a case where a magnetron is used as the oscillating device of the transmitter 5, it is necessary to take into consideration the idle time of the magnetron that occurs between one transmit and the next in determining the pulse signal transmission timing. It is therefore desirable to take into consideration the idle time of the magnetron between one transmit and the next when determining the transmit pulse pattern.

The echo signal thus obtained from the receiver 7 is sent to the on-screen image generator 10. The on-screen image generator 10 performs such operations on the incoming echo signal as gain adjustment, unwanted signal rejection and resampling of the received echo data in a manner suited to the specified range scales based on the operational parameters supplied according to the corresponding pulselengths and generates radar pictures for simultaneous presentation on the two (or more) range scales selected by the range scale selector 1. Consequently, the radar apparatus can simultaneously present the radar pictures on different range scales on the display unit 11.

As thus far discussed, the tuning voltage setting timing generator 8 generates the tuning voltage setting timing according to the transmit pulse pattern defining the order of transmission of pulses having different pulselengths and performs the tuning operation based on the tuning voltage setting timing generated by the tuning voltage setting timing generator 8 in the radar apparatus of the first embodiment, so that the radar apparatus can properly control the tuning voltage setting timing and obtain the radar pictures of high quality by virtue of the tuning operation optimized for the selected transmission pulselengths. Additionally, even when the radar apparatus is set to alternately transmit microwave pulses having two different pulselengths, the radar apparatus can obtain echo signals of high quality from the two pulselengths and present highly visible radar pictures.

Also, as the transmit pulse pattern of the pulse signal is determined according to the echo signal sampling period and the time lag from the beginning of tuning voltage setting to the point in time when the desired local oscillation frequency is reached, it is possible to switch the pulselength of the transmit pulse at a high switching rate within a range in which the tuning operation is executable according to the selected transmission pulselengths and thereby transmit and receive the pulse signal in an efficient manner.

In a case where a magnetron is used as the oscillating device of the transmitter 5, the transmit pulse pattern of the pulse signal is determined based on the echo signal sampling period and the time lag from the beginning of tuning voltage setting to the point in time when the desired local oscillation frequency is reached as well as the idle time of the magnetron between one transmit and the next that is determined by the transmitter 5. This also makes it possible to switch the pulselength of the transmit pulse at a high switching rate within a range in which the tuning operation is executable according to the selected transmission pulselengths and thereby transmit and receive the pulse signal in an efficient manner.

While the above-described radar apparatus of the first embodiment is configured such that the parameters used for generating the transmit pulse pattern are stored in advance in storage means like a register, the invention is not limited to this configuration. Instead, the radar apparatus may be so configured as to generate a transmit pulse pattern at each transmit cycle through mathematical operation performed based on the echo signal sampling period and the time lag from the beginning of tuning voltage setting to the point in time when the desired local oscillation frequency is reached. This makes it possible to freely set the transmit pulse pattern and tuning voltage setting timing in a manner not restricted by the previously stored parameters.

Second Embodiment

A radar apparatus according to a second embodiment of the invention is now described.

As previously discussed with reference to the radar apparatus of the first embodiment, the transmitting frequency slightly deviates when the radar apparatus is switched from one transmission pulselength to another as shown in Tables 1 and 2. For this reason, the radar apparatus of the first embodiment generates the tuning voltage setting timing signal based on which the tuning voltage is varied to adjust the oscillating frequency of the local oscillator 72 to make up for transmitting frequency deviation that occurs each time the pulselength is switched.

This kind of operation of the first embodiment, if performed each time the radar apparatus is switched from one transmission pulselength to another, makes it necessary to frequently alter the tuning voltage, resulting potentially in an increase in work load imposed on such signal processors as the tuning processor 9. Frequent switching of the tuning voltage would also develop a problem that the number of factors which may cause tuning instability increases.

In light of the foregoing, the radar apparatus of the second embodiment is so configured as to decide whether or not to alter the tuning voltage depending on a combination of pulselengths before altering the pulselength of the pulse signal to be transmitted. This approach is intended to minimize the number of times of tuning voltage alterations and thereby achieve optimum tuning operation.

Figure 3:
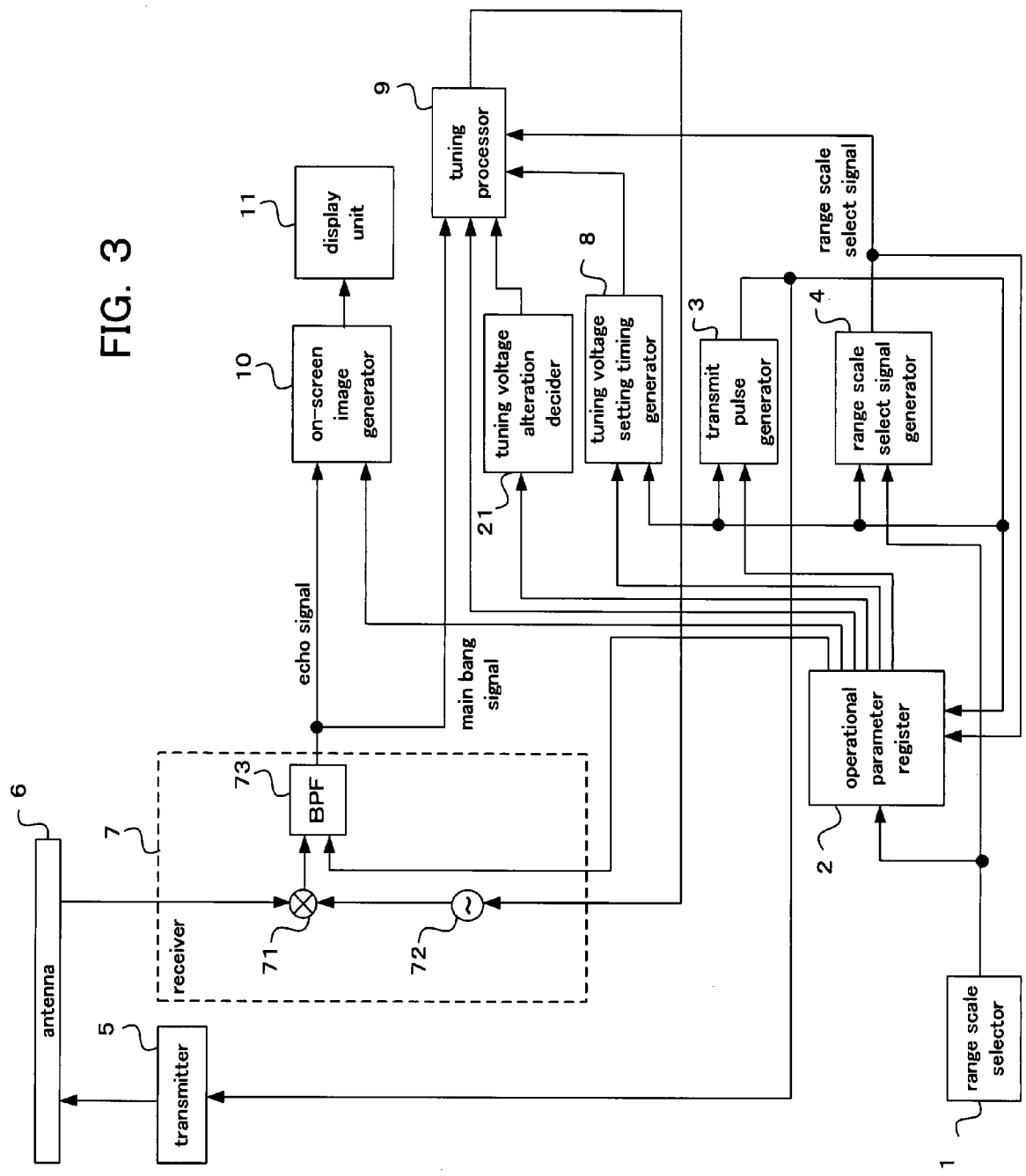
FIG. 3 is a block diagram showing the configuration of a radar apparatus according to a second embodiment of the invention.

FIG. 3 is a block diagram showing the configuration of the radar apparatus according to the second embodiment of the invention, in which elements like those of the radar apparatus of the first embodiment are designated by the same reference numerals as used in FIG. 1 and a description of such elements are not given below again.

Referring to FIG. 3, the radar apparatus of the second embodiment includes a range scale selector 1, an operational parameter register 2, a transmit pulse generator 3, a range scale select signal generator 4, a transmitter 5, an antenna 6, a receiver 7, a tuning voltage setting timing generator 8, a tuning processor 9, an on-screen image generator 10, a display unit 11 and a tuning voltage alteration decider 21.

The tuning voltage alteration decider 21 decides whether or not to alter the tuning voltage based on a combination of alternate pulselengths before and after the pulselength of the transmit signal generated by the transmitter 5 is altered. The tuning voltage alteration decider 21 outputs a result of this decision to the tuning processor 9. Then, the tuning processor 9 determines whether or not to alter the tuning voltage based on the result of the decision made by the tuning voltage alteration decider 21 and subsequently performs the tuning operation.

The decision on whether to alter the tuning voltage is made based on required tuning ranges before and after pulselength alteration that are determined by bandwidths of receiving filters corresponding to the pulselengths of the transmit signal and on the transmitting frequency deviation that occurs when the pulselength is altered.

Figure 4:
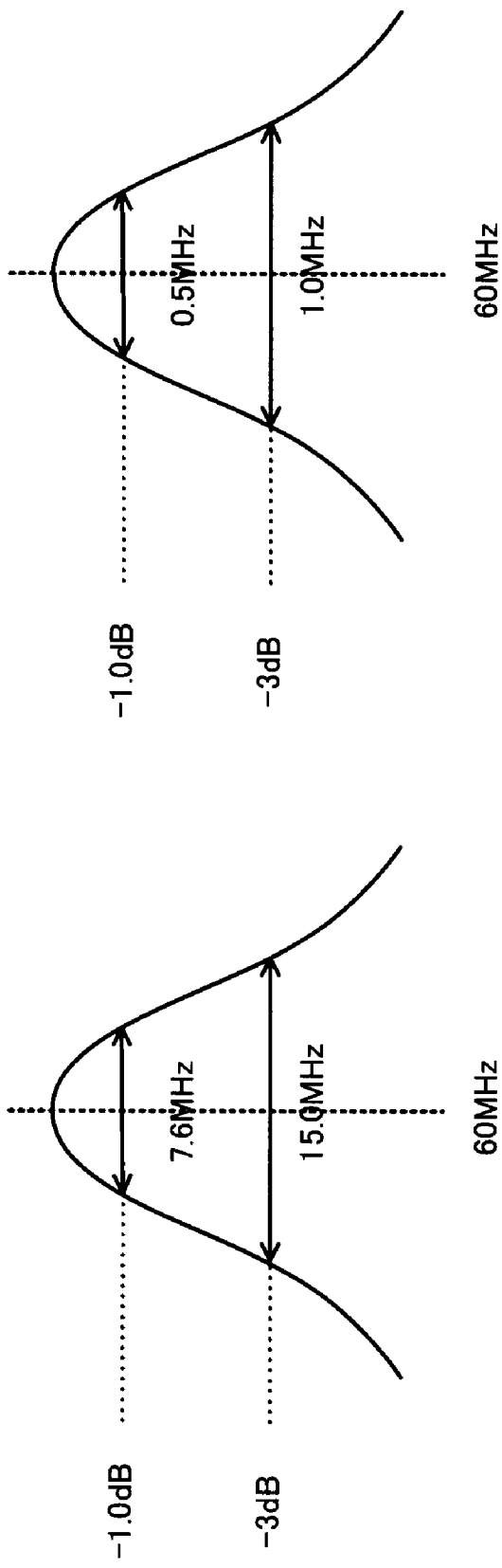
FIG. 4 is a diagram used for explaining a relationship between bandwidths of receiving filters and required tuning ranges to be obtained by tuning.

FIG. 4 is a diagram used for explaining a relationship between bandwidths of the receiving filters and required tuning ranges. More particularly, FIG. 4 shows examples in which the receiving filters have bandwidths (between −3 dB points) of 15.0 MHz and 1.0 MHz. In the examples of FIG. 4, the filter having the bandwidth of 15.0 MHz (between −3 dB points) must provide an IF tuning range of 60±3.8 MHz to restrict gain loss to −1.0 dB or less, whereas the filter having the bandwidth of 1.0 MHz (between −3 dB points) must provide an IF tuning range of 60±0.25 MHz to restrict gain loss to −1.0 dB or less. While a target range of tuning is a gain loss of −1.0 dB or less in the examples of FIG. 4, the target range of tuning may be set to a gain loss of −0.5 dB or less, for example, depending an intended application. Also, while the bandwidths of the receiving filters at the gain loss of −1.0 dB are set to 60±3.8 MHz and 60±0.25 MHz in the example of FIG. 4, these values can vary in various ways depending on filter characteristics.

Generally speaking, when the bandwidth of a receiving filter is reduced, SNR of a receiver increases, making weak echoes at both near and distant ranges more visible. However, it does not follow that target detectability can be improved by simply narrowing the bandwidth of the filter when receiving a pulse signal, but it is necessary to satisfy an optimality equation BW=1.2/τ to achieve optimum target detection, where BW is the bandwidth of the filter and τ is the pulselength of the pulse signal.

If the bandwidth of the filter is too narrowed, pulses become less sharp in shape, resulting in a decrease in peak level, power loss in a received signal, and eventual deterioration of SNR. It is therefore desirable, in theory, to alter the bandwidth of a filter for the individual pulselengths. Table 3 shows examples of optimum filter bandwidths (between −3 dB points) calculated for the earlier-mentioned four pulse types (S1, M1, M2, L) using the aforementioned optimality equation and required tuning ranges to be obtained by tuning determined based on these bandwidths, wherein a center frequency of the filter passband is 60 MHz.

TABLE 3

| Pulse type | Pulselength | Optimum filter bandwidth | Required tuning range (−3 dB points) |
|---|---|---|---|
| S1 | 80 ns | 15.0 MHz | 60 ± 3.8 MHz |
| M1 | 300 ns | 4.0 MHz | 60 ± 1.0 MHz |
| M2 | 500 ns | 2.4 MHz | 60 ± 0.6 MHz |
| L | 1200 ns | 1.0 MHz | 60 ± 0.25 MHz |

The tuning voltage alteration decider 21 decides whether to alter the tuning voltage according to Tables 2 and 3. The tuning voltage alteration decider 21 makes this decision depending on whether the transmitting frequency after alteration of the tuning voltage falls within the required tuning range to be obtained by tuning shown in Table 3 or not.

In a case where the radar apparatus alternately transmits microwave pulses having two different pulselengths at regular intervals, the tuning voltage alteration decider 21 preferably makes the aforementioned decision in a manner explained below.

Specifically, assuming that the radar apparatus is now switched from one pulse type to another, the tuning voltage alteration decider 21 first adds the amount of the transmitting frequency deviation shown in Table 2 that occurs as a result of pulselength alteration to a minimum permissible frequency and a maximum permissible frequency of the pulse type having a narrower required tuning range. The tuning voltage alteration decider 21 then examines whether two values obtained by adding the transmitting frequency deviation to the minimum and maximum permissible frequencies of the narrower required tuning range fall within a permissible frequency range of the pulse type having a wider required tuning range. If both of the aforementioned two values fall within the permissible frequency range of the pulse type having the wider required tuning range, it is possible to maintain the gain loss within a desired range without altering the tuning voltage, so that the tuning voltage alteration decider 21 decides that there is no need to alter the tuning voltage. If any of the aforementioned two values do not fall within the permissible frequency range of the pulse type having the wider required tuning range, it is impossible to maintain the gain loss within the desired range, so that the tuning voltage alteration decider 21 decides that the tuning voltage needs to be altered.

For example, if the radar apparatus is set to alternately transmit microwave pulses in pulse types S1 and L, the required tuning range for pulse type S1 between the −1.0 dB points is 60±3.8 MHz (Table 3) and the amount of the transmitting frequency deviation is 3.1 MHz (Table 2), that is, the transmitting frequency in pulse type S1 is 3.1 MHz higher than that in pulse type L. Accordingly, the tuning voltage alteration decider 21 adds the amount of the transmitting frequency deviation 3.1 MHz to the minimum permissible frequency 59.75 MHz and the maximum permissible frequency 60.25 MHz of pulse type L. The values obtained by adding 3.1 MHz to the minimum and maximum permissible frequencies of the narrower required tuning range are 62.85 MHz and 63.35 MHz, respectively. These values fall within the permissible frequency range of pulse type S1 having a wider required tuning range, so that the tuning voltage alteration decider 21 decides that there is no need to alter the tuning voltage. This means that the tuning processor 9 may perform the tuning operation for pulse type L only at all times.

If the radar apparatus is set to alternately transmit microwave pulses in pulse types M1 and L, on the other hand, the required tuning range for pulse type M1 between the −1.0 dB points is 60±1.0 MHz (Table 3) and the amount of the transmitting frequency deviation is 1.2 MHz (Table 2), that is, the transmitting frequency in pulse type M1 is 1.2 MHz higher than that in pulse type L. Accordingly, the tuning voltage alteration decider 21 adds the amount of the transmitting frequency deviation 1.2 MHz to the minimum permissible frequency 59.75 MHz and the maximum permissible frequency 60.25 MHz of pulse type L. The values obtained by adding 1.2 MHz to the minimum and maximum permissible frequencies of the narrower required tuning range are 60.95 MHz and 61.45 MHz, respectively. Among these values, 61.45 MHz does not fall within the permissible frequency range of pulse type M1 having a wider required tuning range. It follows that not all frequencies in a frequency range of 60.95 MHz to 61.45 MHz that the transmitting frequency in pulse type L can take fall within the permissible frequency range of pulse type M1 having the wider required tuning range. Thus, the tuning voltage alteration decider 21 decides that the tuning voltage needs to be altered and, as a result, the tuning processor 9 performs the tuning operation to alter the tuning voltage each time the pulselength of the transmit signal is switched between M1 and L.

As thus far discussed, the radar apparatus of the second embodiment is provided with the tuning voltage alteration decider 21 which decides whether or not to alter the tuning voltage based on a combination of alternate pulselengths before the pulselength of the transmit signal generated by the transmitter 5 is altered, and the tuning processor 9 determines whether or not to alter the tuning voltage based on the result of the decision made by the tuning voltage alteration decider 21. The radar apparatus thus configured can alleviate work load imposed on such signal processors as the tuning processor 9 and decrease the number of factors which may cause tuning instability.

While the above-described radar apparatus of the second embodiment is configured such that optimum filter bandwidths are produced for the individual pulselengths of the transmit signal, the radar apparatus need not necessarily have a plurality of filtering circuits suited to the individual pulselengths. According to the invention, the radar apparatus may be so configured as to divide the pulselengths of the transmit signal into groups and produce plural filter passbands for the individual groups of pulselengths. Using the aforementioned examples of Tables 1 to 3, this would be accomplished by use of a BPF having a bandwidth of 12 MHz for pulse types S1 and M1 and a BPF having a bandwidth of 1.5 MHz for pulse types M2 and L, for example. This alternative configuration would eliminate the need to provide the filtering circuits for the individual pulselengths, making it possible to achieve a cost reduction.

While the foregoing discussion of the first and second embodiments has dealt with the configurations in which the transmitter 5 generates the pulse signal having pulselengths suited to the range scales specified by the range scale selector 1, the invention is not limited thereto but may be modified to include a pulselength specifier for specifying one or more pulselengths of pulses to be transmitted and a tuning voltage setting timing is determined according to the combination of pulselengths.

What is claimed is:

1. A radar apparatus capable of transmitting a pulse signal including pulses having pulselengths assigned to at least two range scales and receiving a returning echo signal through a single antenna, said radar apparatus comprising:
   a range scale selector for specifying said at least two range scales on which radar pictures are displayed;
   a transmitter for generating the pulse signal having the pulselengths assigned to the individual range scales according to a specific transmit pulse pattern, wherein the pulse signal has a frequency that changes as a result of changes is said pulselengths;
   a receiver for down-converting the received echo signal using a local oscillation frequency;
   a tuning voltage setting timing generator for generating a tuning voltage setting timing according to said transmit pulse pattern; and
   a tuning processor for controlling the local oscillation frequency by altering a tuning voltage based on transmitting frequency deviation that occurs as a result of pulselength alteration according to said tuning voltage setting timing,
   the radar apparatus further comprising a tuning voltage alteration decider for deciding whether or not to alter the tuning voltage based on a combination of alternate pulselengths before and after altering the pulselength of the transmitted pulse signal, wherein said tuning processor performs operation for altering the tuning voltage based on the result of decision made by said tuning voltage alteration decider.

2. A radar apparatus capable of transmitting a pulse signal including pulses having at least two different pulselengths and receiving a returning echo signal through a single antenna, said radar apparatus comprising:
   a transmission pulselength specifier for specifying said at least two different pulselengths;
   a transmitter for generating the pulse signal having said at least two different pulselengths specified by said transmission pulselength specifier according to a specific transmit pulse pattern, wherein the pulse signal has a frequency that changes as a result of changes is said pulselengths;
   a receiver for down-converting the received echo signal using a local oscillation frequency;
   a tuning voltage setting timing generator for generating a tuning voltage setting timing according to said transmit pulse pattern; and
   a tuning processor for controlling the local oscillation frequency by altering a tuning voltage based on transmitting frequency deviation that occurs as a result of pulselength alteration according to said tuning voltage setting timing,
   the radar apparatus further comprising a tuning voltage alteration decider for deciding whether or not to alter the tuning voltage based on a combination of alternate pulselengths before and after altering the pulselength of the transmitted pulse signal, wherein said tuning processor performs operation for altering the tuning voltage based on the result of decision made by said tuning voltage alteration decider.

3. The radar apparatus according to claim 1, wherein said receiver filters the echo signal by use of a receiving filter having bandwidths suited to the transmission pulselengths, and said tuning voltage alteration decider decides whether or not to alter the tuning voltage based on required tuning range before and after pulselength alteration that are determined by the bandwidths of the receiving filter corresponding to the transmission pulselengths and on transmitting frequency deviation that occurs as a result of pulselength alteration.

4. The radar apparatus according to claim 2, wherein said receiver filters the echo signal by use of a receiving filter having bandwidths suited to the transmission pulselengths, and said tuning voltage alteration decider decides whether or not to alter the tuning voltage based on required tuning range before and after pulselength alteration that are determined by the bandwidths of the receiving filter corresponding to the transmission pulselengths and on transmitting frequency deviation that occurs as a result of pulselength alteration.

5. The radar apparatus according to claim 3, wherein said tuning voltage alteration decider examines whether two values, obtained by adding the transmitting frequency deviation that occurs as a result of pulselength alteration to a minimum and a maximum permissible frequency of the narrower required tuning range between which are obtained before and after pulselength alteration, fall within a permissible frequency range of the wider required tuning range, and causes said tuning processor to perform tuning operation without altering the tuning voltage if both of said two values fall within the permissible frequency range of the wider required tuning range and otherwise to perform the tuning operation upon altering the tuning voltage.

6. The radar apparatus according to claim 4, wherein said tuning voltage alteration decider examines whether two values,
   obtained by adding the transmitting frequency deviation that occurs as a result of pulselength alteration to a minimum and a maximum permissible frequency of the narrower required tuning range between which are obtained before and after pulselength alteration, fall within a permissible frequency range of the wider required tuning range, and
   causes said tuning processor to perform tuning operation without altering the tuning voltage if both of said two values fall within the permissible frequency range of the wider required tuning range and otherwise to perform the tuning operation upon altering the tuning voltage.

7. A tuning method of a radar apparatus, said tuning method comprising:
   a transmission pulselength specification step for specifying at least two different pulselengths of pulses of a pulse signal to be transmitted;
   a transmit step for transmitting the pulse signal including the pulses having the pulselengths specified in said transmission pulselength specification step according to a specific transmit pulse pattern, wherein the pulse signal has a frequency that changes as a result of changes is said pulselengths; a receive step for down-converting a received echo signal using a local oscillation frequency;

a tuning voltage setting timing generating step for generating a tuning voltage setting timing according to said transmit pulse pattern; and a tuning operation step for controlling the local oscillation frequency by altering a tuning voltage based on transmitting frequency deviation that occurs as a result of pulselength alteration according to said tuning voltage setting timing;

the tuning method further comprising:

a tuning voltage alteration deciding step for deciding whether or not to alter the tuning voltage based on a combination of alternate pulselengths before and after altering the pulselength of the transmitted pulse signal, wherein said tuning processor performs operation for altering the tuning voltage based on the result of decision made by said tuning voltage alteration decider.

* * * * *